US007382350B2

(12) United States Patent
Huang et al.

(10) Patent No.: US 7,382,350 B2
(45) Date of Patent: Jun. 3, 2008

(54) DEVICE AND METHOD FOR ADJUSTING BACKLIGHT BRIGHTNESS

(75) Inventors: Jih-Fon Huang, Jhubei (TW); Huan-Hsin Li, Toufen Township, Miaoli County (TW)

(73) Assignee: AU Optronics Corp., Hsinchu (TW)

( * ) Notice: Subject to any disclaimer, the term of this patent is extended or adjusted under 35 U.S.C. 154(b) by 610 days.

(21) Appl. No.: 10/973,686

(22) Filed: Oct. 26, 2004

(65) Prior Publication Data

US 2005/0219199 A1 Oct. 6, 2005

(30) Foreign Application Priority Data

Apr. 6, 2004 (TW) .............................. 93109462 A

(51) Int. Cl.
*G09G 3/36* (2006.01)
*G09G 5/00* (2006.01)
*G09G 5/10* (2006.01)
*G06F 3/038* (2006.01)

(52) U.S. Cl. ...................... 345/102; 345/204; 345/211; 345/212; 345/214; 345/690

(58) Field of Classification Search ................ 345/102, 345/204, 211, 212, 214, 690
See application file for complete search history.

(56) References Cited

U.S. PATENT DOCUMENTS

| | | | | |
|---|---|---|---|---|
| 6,621,482 | B2 * | 9/2003 | Fuller | 345/102 |
| 6,839,048 | B2 * | 1/2005 | Park | 345/102 |
| 7,113,163 | B2 * | 9/2006 | Nitta et al. | 345/102 |
| 7,136,044 | B2 * | 11/2006 | Sasaki | 345/102 |
| 7,218,305 | B2 * | 5/2007 | Nose | 345/102 |
| 2004/0179002 | A1 * | 9/2004 | Park et al. | 345/204 |

* cited by examiner

*Primary Examiner*—Sumati Lefkowitz
*Assistant Examiner*—Alexander S. Beck
(74) *Attorney, Agent, or Firm*—Thomas, Kayden, Horstemeyer & Risley

(57) ABSTRACT

A device and method for adjusting backlight brightness employed in a display. The device has a buffer, a counter, and a comparator. The buffer receives and stores an image data of a frame. The counter receives the image data and obtains an image-loading value of the image data. The comparator is coupled to the counter and compares the image-loading value with a preset image-loading value. The comparator outputs a control signal indicating the comparison result to a backlight module to adjust the brightness of the backlight module.

7 Claims, 5 Drawing Sheets

DEVICE AND METHOD FOR ADJUSTING BACKLIGHT BRIGHTNESS

BACKGROUND

The invention relates to an adjustment device, and in particular to a device employed in a display for adjusting backlight brightness.

Liquid crystal displays (LCDs) are applied in a variety of electronic devices, such as mobile phones, digital cameras, personal digital assistants, and other devices in environments providing varying degrees of brightness. In order to provide adequate display brightness, backlight sources are provided.

Conventionally, backlight brightness of a LCD panel is adjusted by detecting ambient brightness with an external detector, thereby balancing the ambient luminosity and the backlight brightness. When the ambient brightness is high, low backlight brightness is provided to the LCD panel. When the ambient brightness is low, high backlight brightness is provided to the LCD panel. However, when the ambient brightness is high and gray values of an image on the LCD panel low, providing low backlight brightness to the LCD panel generates a dark image on the LCD panel, affecting display. Moreover, when two images with different light degrees are switched, users cannot easily respond to the change.

SUMMARY

Accordingly, embodiments of the invention provide a device and method for adjusting backlight brightness that ameliorates disadvantages of the related art.

First, an image data of a frame is provided, and an image-loading value of the image data is obtained accordingly. The image-loading value is compared with a preset image-loading value. Then, brightness of the backlight module is adjusted in accordance with the comparison result.

Further embodiments of the invention provided is a device for adjusting backlight brightness in a display comprising a panel and a backlight module. The device comprises a buffer, a counter, and a comparator. The buffer receives and stores an image data of a frame. The counter receives the image data and obtains an image-loading value of the image data. The comparator, coupled to the counter, compares the image-loading value with a preset image-loading value, and outputs a control signal indicating the comparison result to the backlight module for adjustment of brightness.

A detailed description is given in the following with reference to the accompanying drawings.

BRIEF DESCRIPTION OF THE DRAWINGS

Various aspects of the invention can be more fully understood by reading the subsequent detailed description and examples with references made to the accompanying drawings, wherein.

DETAILED DESCRIPTION

First Embodiment

Figure 1:
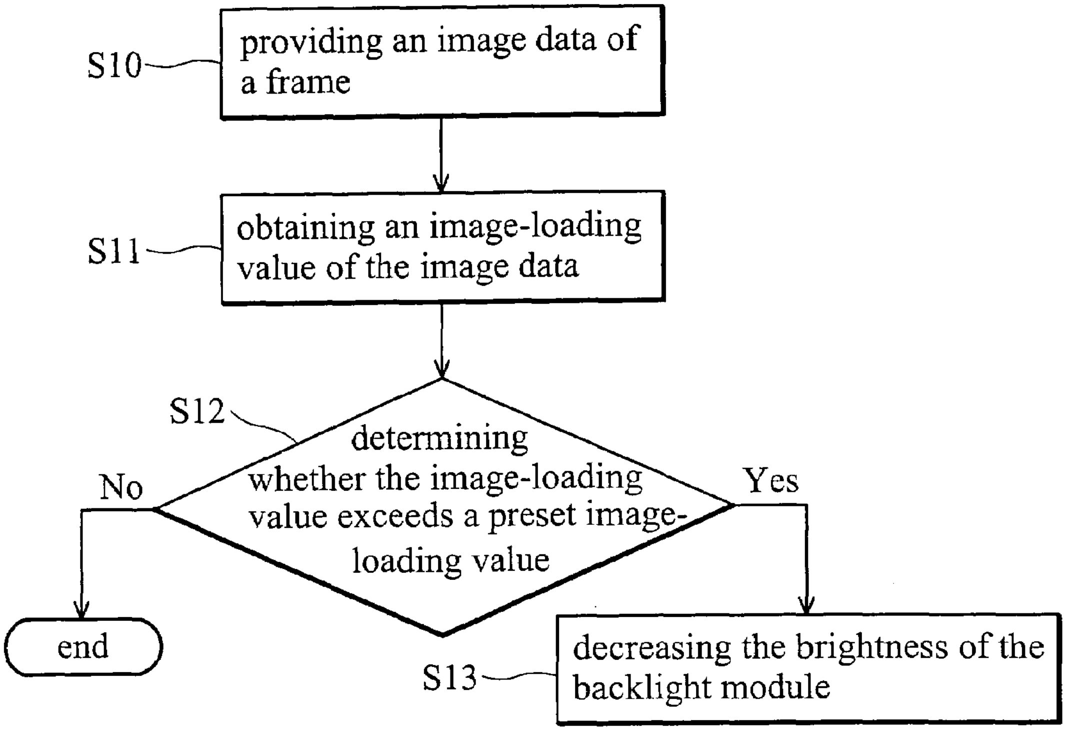
FIG. 1 is a flowchart of a method for adjusting backlight brightness according to the first embodiment of the invention.

FIG. 1 is a flowchart of a method for adjusting backlight brightness according to a first embodiment of the invention. The method is employed in a backlight module of a display. First, an image data of a frame is provided (step S10), and an image-loading value of the image data is obtained accordingly (step S11). It is determined whether the image-loading value exceeds a preset image-loading value (step S12) and brightness of the backlight module is adjusted accordingly. When the image-loading value exceeds the preset image-loading value, the brightness of the backlight module is decreased as a panel of the display shows the frame (step S13).

Figure 2:
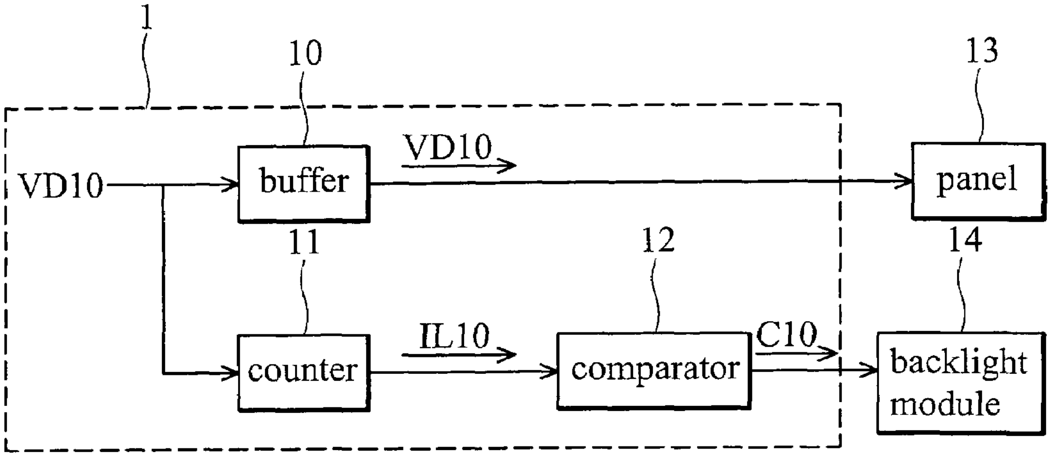
FIG. 2 shows a device for adjusting backlight brightness employed in the method of FIG. 1.

FIG. 2 shows a device for adjusting backlight brightness employed in the method of FIG. 1. The device 1 comprises a buffer 10, a counter 11 and a comparator 12 and is employed in a display further comprising a panel 13 and a backlight module 14. An image data VD10 of a frame is transmitted to the buffer 10 and the counter 11. The buffer 10 stores the image data VD10 temporarily. The counter 11 obtains an image-loading value IL10 of the frame accordingly.

Figure 3:
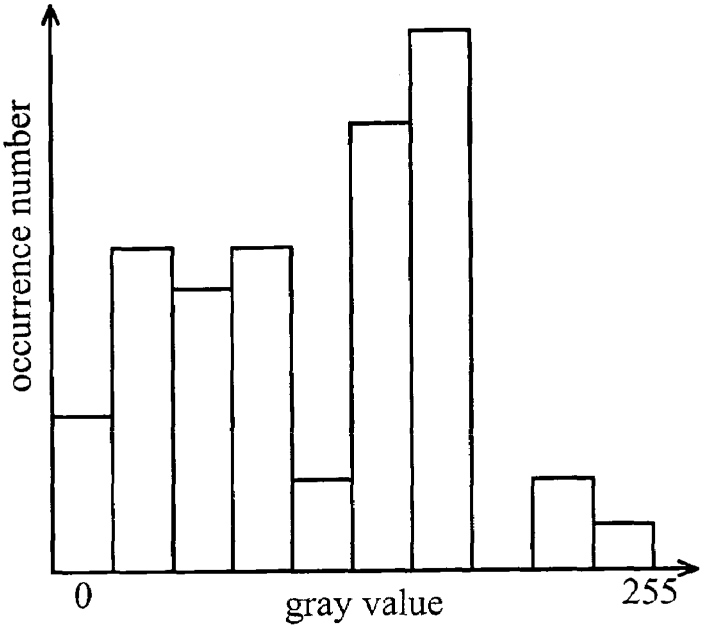
FIG. 3 is an image histogram.

FIG. 3 is an image histogram indicating the occurrence number of each gray value in a frame. The image histogram can represent the characteristic of the frame, such as light and dark degrees. The image-loading value IL10 is obtained according to each gray value and its occurrence number contained in the image data VD10. The image-loading value IL10 is represented by:

$$a=\Sigma N\times G \qquad (1.1)$$

wherein a represents the image-loading value IL10 for the frame, N the occurrence number of each gray value of the frame, and G each gray value.

After calculating the image-loading value IL10 according to equation (1.1), the counter 11 transmits the image-loading value IL10 to the comparator 12. The comparator 12 compares the image-loading value IL10 with a preset image-loading value and outputs a control signal C10 to the backlight module 14 for adjusting brightness of the backlight module 14. When the image-loading value IL10 exceeds the preset image-loading value, the comparator 12 outputs the control signal C10 to the backlight module 14 to decrease the brightness thereof and the buffer 10 outputs the image data VD10 to the panel 13.

Figure 4:
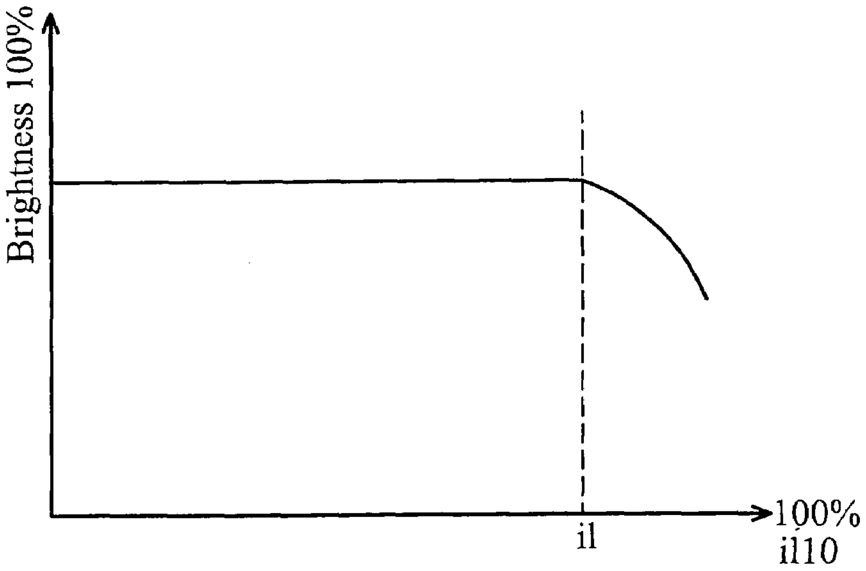
FIG. 4 is a relative diagram of the image-loading value and backlight brightness according to a first embodiment of the invention.

FIG. 4 is a relative diagram of the image-loading value and backlight brightness according to the first embodiment of the invention. The preset image-loading value is represented as "il", and the image-loading value IL10 as "il10". As shown in FIG. 4, the brightness of the backlight module 14 is maintained at the preset level when il10 is less than il, and the brightness decreased when il10 exceeds il.

Second Embodiment

Figure 5:
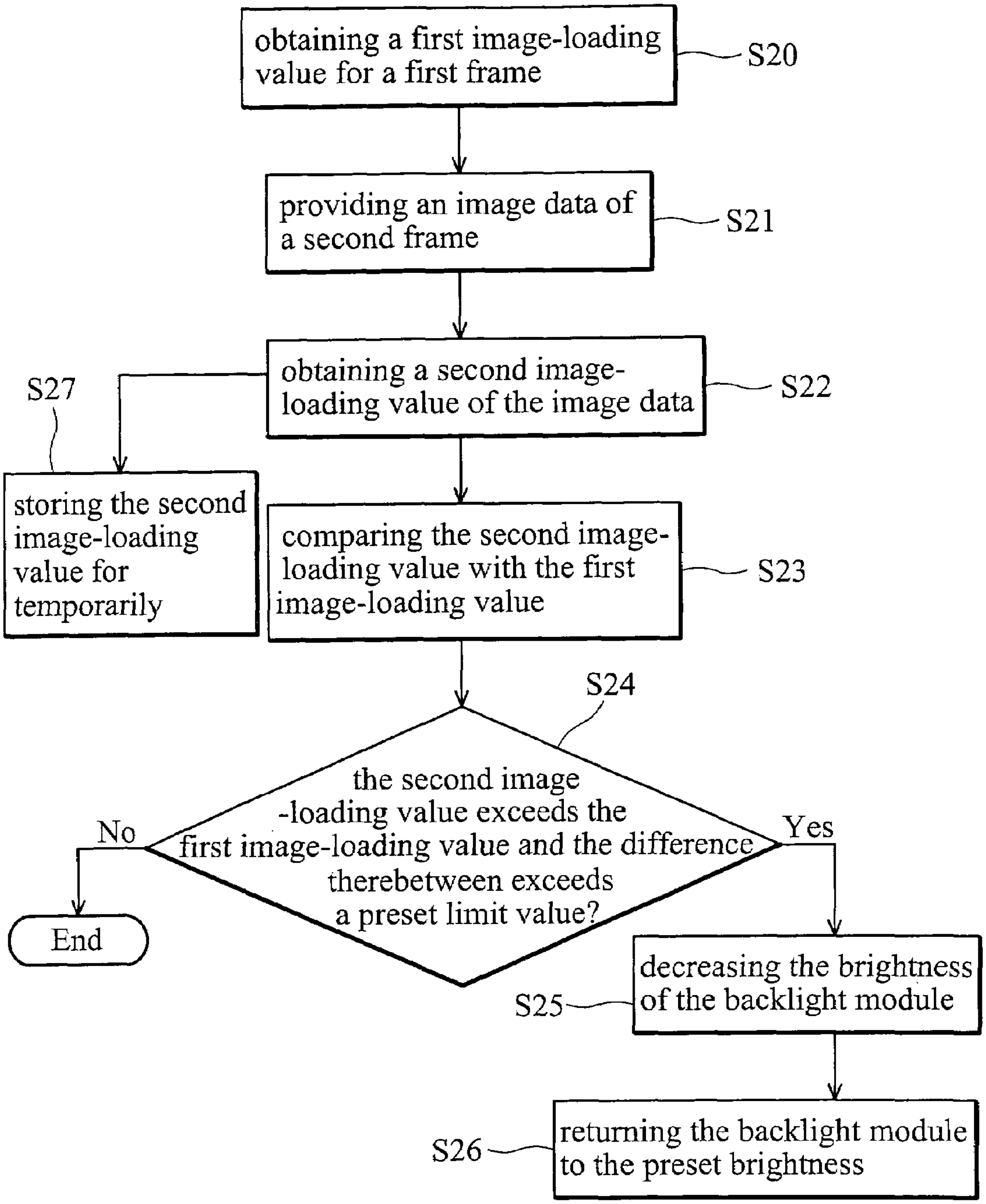
FIG. 5 is a flowchart of a method for adjusting backlight brightness according to a second embodiment of the invention.

FIG. 5 is a flowchart of a method for adjusting backlight brightness according to a second embodiment of the invention. The method is employed in a backlight module with a preset brightness. A first image-loading value for a first frame is obtaining (step S20). An image data of a second frame following the first frame is provided (step S21), and a second image-loading value of image data is obtained according to the image data (step S22). The second image-loading value is compared with the first image-loading value (step S23). Brightness of the backlight module is adjusted by determining whether the second image-loading value exceeds the first image-loading value and the difference therebetween exceeds a preset limit (step S24). The first image-loading value is stored in a register. When the second image-loading value exceeds the first image-loading value and the difference therebetween exceeds a preset limit, the brightness of the backlight module is decreased as a panel of the display shows the second frame (step S25). After the backlight module has been maintained at low brightness for a preset time, the backlight module returns to the preset brightness (step S26). When the difference between the second image-loading value and first image-loading value is less than the preset limit, the backlight module is maintained at the preset brightness. Moreover, after the second image-loading value is obtained, it is stored temporarily (step S27).

Figure 6:
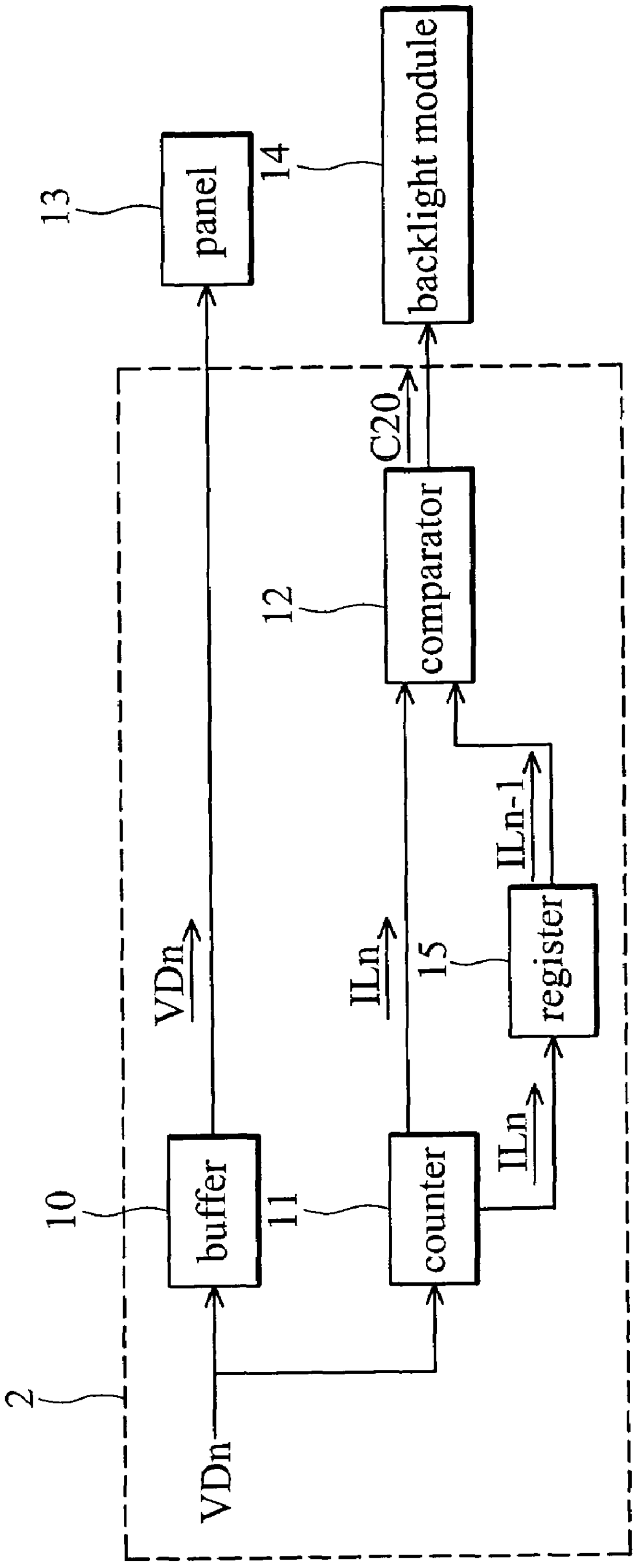
FIG. 6 shows a device for adjusting backlight brightness employed in the method of FIG. 5.

FIG. 6 shows one device for adjusting backlight brightness employed in the method of FIG. 5. The device 2 comprises a buffer 10, a counter 11, a comparator 12, and a register 15 and is employed in a display comprising a panel 13 and a backlight module 14. The register 15 stores an image-loading value ILn−1 for a first frame. The image-loading value ILn−1 is also obtained according to equation (1.1). An image data VDn of a second frame is transmitted to the buffer 10 and the counter 11. The buffer 10 stores the image data VDn temporarily. At the same, the counter 11 obtains an image-loading value ILn of the second frame according to the image data VDn.

After calculating the image-loading value ILn, the counter 11 transmits the image-loading value ILn to the comparator 12 and also to the register 15 for storing temporarily. The comparator 12 compares the image-loading value ILn with the image-loading value ILn−1 and outputs a control signal C20 to the backlight module 14 to adjust brightness of the backlight module 14. When the image-loading value ILn exceeds the image-loading value ILn−1 and the difference therebetween exceeds a preset limit, the comparator 12 outputs the control signal C20 to the backlight module 13 for decreasing the brightness of the backlight module 14 and the buffer 10 outputs the image data VDn to the panel. Then, after the backlight module 14 has been maintain at low brightness for a preset time, the backlight module 14 returns to the preset brightness.

When a subsequent frame is to be displayed on the panel 13, the image-loading value ILn stored in the register 15 is compared with an image-loading value ILn+1 for the subsequent image to adjust the brightness of the backlight module.

Figure 7:
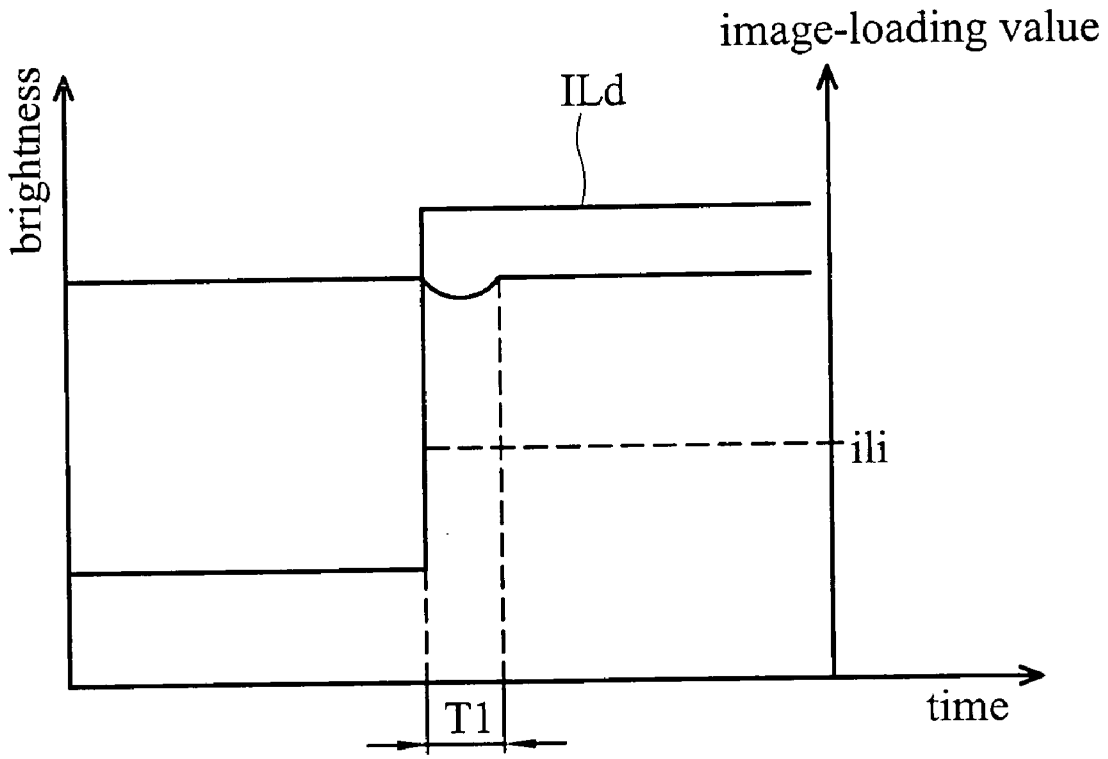
FIG. 7 is a relative diagram of the image-loading values of two continuous images and backlight brightness according to the second embodiment of the invention.

FIG. 7 shows a relative diagram of the image-loading value of two continuous frames and backlight brightness according to the second embodiment of the invention. The difference between the image-loading values for two continuous frames is represented as "ild", the preset limit as "ili". As shown in FIG. 7, the backlight module 14 is maintained at preset brightness when ild is less than ili. The brightness is decreased when ild exceeds ili and then returns to the preset brightness after the backlight module 14 has been maintained at low brightness for a preset time T1.

Finally, while the invention has been described by way of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for adjusting backlight brightness in a display comprising a panel and a backlight module, comprising:

obtaining a first image-loading value for a first frame;

providing an image data for a second frame;

obtaining a second image-loading value of the image data;

comparing the second image-loading value with the first image-loading value to generate a comparison result; and adjusting brightness of the backlight module in accordance with the comparison result;

wherein the first image-loading value is obtained according to the formula a=ΣN×G, wherein a is the image-loading value, N is the occurrence number of each gray value of the frame, and G is the gray value, and N and G are contained in the image data.

2. The method as claimed in claim 1 wherein when the second image-loading value exceeds the first image-loading value and the difference therebetween exceeds a preset limit value, the brightness of the backlight module is decreased.

3. The method as claimed in claim 2, wherein the brightness of the backlight module returns to a preset brightness after the backlight module has been maintain at low brightness for a preset time.

4. The method as claimed in claim 1, further comprising:

storing the first image-loading value temporarily; and storing the second image-loading value to cover the stored first image-loading value after the second image-loading value is obtained.

5. A device for adjusting backlight brightness in a display comprising a panel and a backlight module, comprising:

a buffer receiving and storing an image data of a frame;

a counter receiving the first image data and obtaining a first image-loading value of the image data;

a register coupled to the counter, receiving the first image-loading value and outputting a second image-loading value for a previous image stored after the counter obtains the first image-loading value; and a comparator coupled to the counter and the register, comparing the first image-loading with the second image-loading value, and outputting a control signal indicating the comparison result to the backlight module to adjust brightness of the backlight module; and wherein the first image-loading value is obtained according to the formula a=ΣN×G, wherein a is the image-loading value, N is the occurrence number of each gray value of the frame, and G is the gray value, and N and G are contained in the image data.

6. The device as claimed in claim 5, wherein when the first image-loading value exceeds the second image-loading value and the difference therebetween exceeds a preset limit value, the comparator outputs the control signal to the backlight module to decrease the brightness of the backlight module.

7. The device as claimed in claim 6, wherein the brightness of the backlight module returns to a preset brightness after the backlight module has been maintain at low brightness for a preset time.

* * * * *